March 10, 1964     J. W. SCOTT, JR     3,124,523
PRODUCTION OF HIGH OCTANE GASOLINES FROM NAPHTHAS
Filed Jan. 9, 1961
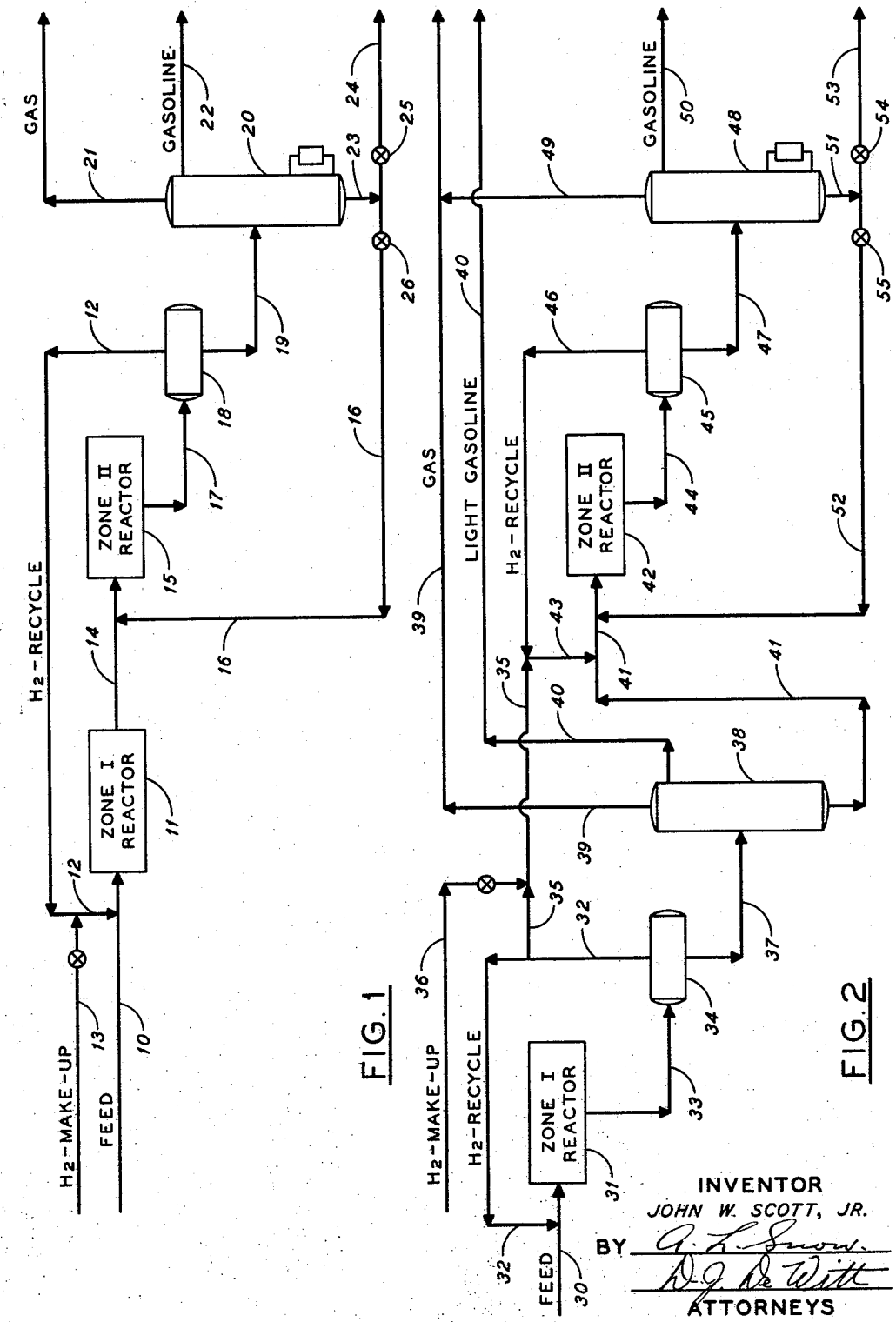
INVENTOR
JOHN W. SCOTT, JR.
ATTORNEYS 3,124,523
PRODUCTION OF HIGH OCTANE GASOLINES
FROM NAPHTHAS
John W. Scott, Jr., Ross, Calif., assignor to California Research Corporation, San Francisco, Calif., a corporation of Delaware
Filed Jan. 9, 1961, Ser. No. 84,475
1 Claim. (Cl. 208—62)

This invention relates to a process for the production of high octane gasolines from petroleum distillates.

This application is a continuation-in-part of my copending application Serial No. 575,167, filed March 30, 1956, now abandoned, which in turn was a continuation-in-part of my prior application Serial No. 428,154, filed May 7, 1954 (now abandoned).

The present invention is directed to a process whereby naphthas are catalytically reformed and are thereafter subjected to further controlled conversion in the presence of hydrogen and a catalyst comprising a hydrogenating-dehydrogenating component supported on a material having active cracking characteristics. While the reaction which takes place in the reforming step is productive of hydrogen, said hydrogen is normally consumed during the subsequent conversion step wherein the conditions are so chosen as to effect hydrocracking of alkyl side chains from aromatic nuclei but not to promote substantial ring hydrogenation. The reactions which occur in this conversion zone appear to be predominantly ones of isomerization and cracking, and for this reason the process of the present invention is referred to herein as one wherein the feed is passed first through a reforming zone and then is passed in whole or in part through an isomerization-cracking zone.

The naphthas which are subjected to reforming and then to isomerization-cracking pursuant to the process of the invention are those which boil in a range falling within the limits of from about 180 to 550° F. and preferably from about 250 to 450° F. These stocks may be either straight run naphthas, thermally cracked or catalytically cracked naphthas, or blends thereof. However, the stocks employed should be low in nitrogen if poisoning of the reforming catalyst is to be avoided. Thus, the stock employed should be one containing less than 50 p.p.m., preferably less than 5 p.p.m. and more preferably below 1 p.p.m. of nitrogen. In the case of stocks which are not already sufficiently low in nitrogen, acceptable levels can be reached by hydrogenating the stock in a presaturation zone wherein the naphtha (usually of cracked origin) is contacted with a hydrogenation catalyst which is resistant to nitrogen and sulfur poisoning. A suitable catalyst is a cobalt-molybdenum catalyst supported on alumina. The catalyst ordinarily contains 8 to 12% molybdenum oxide and about 1 to 3% of cobalt oxide. The presaturation zone is ordinarily operated at 700 to 850° F., at 200 to 1000 p.s.i.g., at a space velocity of 1 to 5 v./v./hr., and with a hydrogen-to-naphtha ratio of from about 1000 to 5000 or more s.c.f. $H_2$ per barrel of naphtha. The olefins contained in the cracked naphtha are saturated; sulfur contained in the naphtha is converted to hydrogen sulfide; and nitrogen contained in the naphtha is converted to ammonia.

The effluent from this presaturation zone, normally after treatment to remove sulfur and nitrogen-containing products formed during the treatment, is then ready to be passed to the reforming zone as hereinafter described.

Having selected or prepared the (low nitrogen) feed stock, the present process is effected by passing a mixture of feed stock and hydrogen through the catalyst in the reforming zone at temperatures usually in the range of from 850 to 1000° F., under pressures in the range of from 200 to 900 p.s.i.g., and at space velocities in the range of from 1 to 3 v./v./hr. Ordinarily from about 2000 to 6000 s.c.f. $H_2$ are passed over the catalyst with each barrel of naphtha. Two catalysts are commonly employed in catalytic reforming; either molybdenum oxide on alumina, or platinum on alumina. The molybdenum oxide catalysts usually contain 8 to 12% molybdenum oxide disposed on an alumina support, while the platinum catalyst usually contains from about 0.1 to 1% by weight of metallic platinum dispersed on an alumina support. Supports having low cracking activity are deliberately chosen for use in the reforming catalysts. Catalytic reforming as commercially practiced is characterized by a net production of hydrogen. The most significant reaction in the reforming process appears to be the dehydrogenation of naphthenic hydrocarbons to produce aromatic hydrocarbons. Ordinarily, the net production of hydrogen in commercial catalytic reforming amounts to from 600 to 1000 cubic feet of hydrogen per barrel of naphtha charged.

It has now been found that catalytically reformed naphthas produced by the methods described above can be greatly improved in octane rating and in boiling point and other characteristics by reacting said reformed naphtha with hydrogen (either that produced in the reforming zone or additional hydrogen, or both) in a cracking-isomerization zone at temperatures in the range of from about 500° to 900° F., preferably about 600° to 825° F., pressures of at least 600 p.s.i.g. and space velocities of from about 0.2 to 15, with a catalyst comprising one or more components having hydrogenating-dehydrogenating characteristics supported on a material having active cracking characteristics under said reaction conditions. In this isomerization-cracking zone there is consumed from about 1000 to 2000 s.c.f. hydrogen per barrel of naphtha fed to said zone which is converted to a product having an over-all boiling range lower than that of the feed. Accordingly, since the per pass conversion in the isomerization-cracking zone to said product of lower boiling range normally is from about 25 to 75%, the amount of hydrogen which is produced in the preceding reforming step is sufficient to provide the hydrogen required in the subsequent isomerization-cracking operation when the latter is operated on a once-through basis. However, as part or all of the unconverted product from the isomerization-cracking zone is recycled thereto, additional hydrogen must be brought into the system when necessary. On the other hand, when a considerable portion of the product from the reforming zone (as, for example, the lighter ends boiling below about 300 to 325° F.) is recovered as product and only the heavier portion of the catalytic reformate is fed to the isomerization-cracking zone, the hydrogen produced in the reforming zone is in many cases sufficient to provide the requirements of the reaction taking place in the isomerization-cracking zone, even when said heavier feed portion is processed to conversions approaching 100% by practice of recycle techniques.

As indicated above, the present invention is effected by passing hydrogen and a product from the catalytic reforming zone through the catalyst in the isomerization-cracking zone under elevated conditions of temperature and pressure. The feed passed to the isomerization-cracking zone will be only hydrocarbons boiling below about 600° F., because heavier feeds cause undesirable rates of catalyst fouling, undesired side reactions, and are generally unsuited for the purposes of the present process. The feed to the isomerization-cracking zone will comprise all or at least a major portion of the effluent from the reforming zone. In cases where the entire effluent is not used as the feed to the isomerization-cracking zone, the catalytic reformate may, for example, be freed of normally gaseous components (including a hydrogen-rich stream which is normally recycled to the reforming zone, with a portion being diverted to the isomerization-cracking zone) with the remaining, normally liquid portion of the reformate then being subsequently processed. Preferably, however, the method employed in the present invention is to separate from the catalytic reformate not only the normally gaseous components, but also a light gasoline fraction having an end point not higher than about 300 to 325° F. and which may be as low as 250 to 275° F. The remaining, heavier fraction of the catalytic reformate is then fed, along with hydrogen in the amount of at least 1500 s.c.f. per barrel of feed, and preferably 300 to 30,000 s.c.f. $H_2$, to the isomerization-cracking zone. As noted above, the temperatures employed in the latter zone range from about 500 to 900° F., and preferably this range is from 600 to 825° F., with the lower temperatures in the range, for example those below 700° F., normally being employed in the first part of a given on-stream period, and with the temperature being raised thereafter as required to maintain the conversion as reasonable levels, the latter, normally being regarded as about 25 to 75% per pass, as described above. Other preferred operating conditions are pressures in the range of from about 1000 to 3000 p.s.i.g. and a space rate of from about 0.3 to 4.0 v./v./hr.

The product from the isomerization-cracking zone is first freed of a hydrogen-rich gas stream which is recycled to one or both of the reforming and isomerization-cracking zones. The remaining product is then freed of its other, normally gaseous components, with the remaining, normally liquid components being so processed as to recover a gasoline of desired initial boiling point and end point characteristics, together with a heavier, bottoms portion. Preferably, the end point of the recovered gasoline fraction falls in the range of from about 300 to 350° F. The bottoms fraction can then be employed as such in heavier gasolines or it is recycled in whole or in part to the isomerization-cracking zone.

The catalyst employed in the isomerization-cracking zone is one wherein a material having hydrogenating-dehydrogenating activity is deposited or otherwise disposed on an active siliceous or non-siliceous cracking catalyst support. The cracking component may comprise any one or more such fluorided or non-fluorided acidic materials as silica-alumina, silica-magnesia, alumina-boria, silica-alumina-zirconia and boria-zirconia composites, as well as various acid treated clays and similar materials. The hydrogenating-dehydrogenating components of the catalyst can be selected from any one or more of the various group V through group VIII metals, as well as the oxides and sulfides thereof, representative materials being the oxides and sulfides of molybdenum, tungsten, vanadium, chromium and the like, as well as metals such as iron, nickel or cobalt and the various oxides and sulfides thereof. If desired, more than one hydrogenating-dehydrogenating component can be present, and good results have been obtained with catalysts containing composites of two or more of the oxides or sulfides of molybdenum, nickel, cobalt, chromium and zinc, and with mixtures of said oxides with fluorine. Depending on the activity thereof, the amount of the hydrogenating-dehydrogenating component present can be varied within relatively wide limits of from about 0.1 to 15%, based on the weight of the entire catalyst. Within these limits, the amount of said component present should be sufficient to provide a reasonable catalyst on-stream period at require conversion levels, but insufficient to effect substantial saturation of any except highly substituted and polynuclear aromatic rings under the reaction conditions employed in the isomerization-cracking zone. The latter quality, referred to herein as the "severity factor" ($S_a$), can be evaluated by subjecting the catalyst to a standard test employing as a feed stock a polyalkyl-substituted benzene (or a mixture of such benzenes) wherein the alkyl groups are methyl and/or ethyl, and wherein the feed boils within a range of from about 320° to 420° F., representative stocks being pseudocumene or an aromatic concentrate recovered (as by adsorption) from catalytically cracked or reformed naphthas. The test involves passing the test feed through the catalyst at a liquid hourly space velocity of 2, pressure of 1200 p.s.i.g., and temperature of 800° F., and with 6000 s.c.f. of hydrogen per barrel of feed for a period of ten hours. The product is then analyzed to determine the percent of the synthetic product portion which is made up of aromatics ($A_p$), and then determining $S_a$ by the following equation, wherein $A_f$ is the percent of aromatics in the feed:

$$S_a = \frac{A_f}{A_p} - 1$$

The above equation is derived, as shown below, from the following general relationships:

$$S_a = \frac{\text{Aromatics hydrogenation index } (A_h)}{\text{Aromatics cracking index } (A_c)}$$

where $$A_h = \frac{\text{Percent aromatics in feed } (A_f) \text{ minus percent aromatics in the product portion boiling below initial boiling point of feed } (A_p)}{\text{Percent aromatics in feed } (A_f)}$$

$$A_c = \frac{\text{Percent aromatics in the product portion boiling below initial boiling point of feed } (A_p)}{\text{Percent aromatics in feed } (A_f)}$$

Combining the above equations:

$$S_a = \frac{A_f}{A_p} - 1$$

In the case of a pure aromatic test feed such as pseudocumene, $A_f$ has a value of 100.

In order to be satisfactorily employed in the present invention, the catalyst material employed in the isomerization-cracking zone should have a severity factor ($S_a$) having a value falling in the range of from about 0 to 5, and preferably of from 0.1 to 2. When $S_a$ has a value greater than 5, there is severe loss in octane number as well as relatively high hydrogen consumption. Such overly active catalysts can, however, be brought into the desired $S_a$ range by suitably reducing the amount of hydrogenating-dehydrogenating component present. While the activity of particular catalysts will vary depending on methods of preparation and other customary variables, as a general rule exemplary catalysts having satisfactory $S_a$ values are those containing from about 0.5 to 12% molybdenum oxide (preferably 1 to 5% molybdenum oxide), 1 to 10% cobalt oxide, 1 to 10% cobalt sulfide, 1 to 10% nickel oxide, 1 to 10% nickel sulfide, mixtures of 1 to 10% nickel sulfide and cobalt sulfide, mixtures of from 1 to 12% molybdenum oxide and from 0.1 to 10% cobalt oxide, or mixtures of from about 0.5 to 10% each of cobalt oxide and chromium oxide, the said hydrogenating-dehydrogenating components being deposited on an active cracking support such as silica-alumina beads having a silica content of about 70 to 95%. Thus, a molybdenum oxide catalyst can readily be prepared by soaking the beads in a solution of ammonium molybdate, drying the catalyst for 24 hours at 220° F., and then calcining the dried material for 10 hours at 1000° F. If cobalt oxide is also to be present, the calcined beads can then be similarly treated with a solution of a cobalt compound.

Among the reactions which take place in the isomerization-cracking zone, that of isomerization is quite significant. However, the principal reaction is evidently one of disproportionation followed by hydrogenation and cracking of the heavier disproportionation products. Thus, trimethyl benzenes in the feed to the isomerization-cracking zone are isomerized and disproportionated to produce xylenes and lighter aromatics on the one hand, and tetramethyl and higher benzenes on the other. These heavier products appear to be selectively hydrogenated in their ring portion, with the resulting molecule then cracking into relatively light iso-paraffins of high octane rating. In this reaction there is obtained not only a net gain in octane rating (despite the loss of the aromatic nucleus), but also, and of equal importance, the boiling range of the product is shifted down into a more useful range. In the case of polynuclear components in the feed to the isomerization zone, it appears that one of the rings is hydrogenated and fractured, with the resulting substituted aromatic product being thereafter cracked (or first disproportionated and then cracked) into the desired light isoparaffins. While a certain amount of n-paraffins are also produced during the reactions taking place in the isomerization-cracking zone, the iso-paraffin/n-paraffin ratio in the effluent from this zone is well on the iso side of thermodynamic equilibrium due to the aforesaid selective hydrodecomposition of the more highly substituted aromatics and polynuclear components.

Under favorable operating conditions the isomerization-cracking catalyst will maintain high activity over periods of 50 to 300 or more hours. Catalyst activity can then be restored by a conventional regeneration treatment involving burning off catalyst contaminants with an $O_2$-containing gas.

The manner in which the present invention is practiced can be illustrated by reference to the figures of the appended drawing which are simplified, alternative flow schemes of refinery units suitable for practicing the invention. FIG. 1 illustrates a simple, practical process flow in which a naphtha is passed through a reforming zone and then, without intermediate separation of hydrogen, is passed through an isomerization-cracking zone wherein the reformed naphtha is upgraded. More specifically, in FIG. 1 a naphtha such as a catalytically cracked naphtha boiling between about 300 and 450 (previously hydrogenated in a presaturation zone to reduce the nitrogen content to a value below 3 p.p.m.) is passed through line 10 into so-called zone I reactor 11 provided with a reforming catalyst. Hydrogen is introduced into line 10 from recycle line 12, which hydrogen supply may be augmented by make-up hydrogen, as required, from line 13. In zone I the naphtha and hydrogen are contacted with a reforming catalyst under known reforming conditions, and the effluent from this zone is then passed through line 14 into a so-called zone II reactor 15 where the charge, which contains ample quantities of hydrogen, is contacted with a catalyst such as one containing about 1 to 5% of molybdenum oxide deposited on an active cracking support such as TCC beads. While the entire effluent from reforming zone I reactor 11 is shown being passed to zone II reactor 15, it will be understood that any lesser, but major, portion of the reforming zone I reactor 11 reactor effluent may be used. It will also be understood that the feed to zone II reactor 15 may be augmented by additional hydrocarbons passed through line 27 from other sources, so long as they boil below about 600° F. The effluent from the isomerization-cracking zone is passed through line 17 into a high pressure gas-liquid separator 18 in which a hydrogen-rich (normally 80 to 95% $H_2$) gaseous stream is taken overhead through line 12 for recycle to reforming zone I, while the balance of the stream is passed through line 19 into a separating system indicated at 20 from which normally gaseous products are recovered through line 21 whereas a gasoline stream of the desired end point is recovered through line 22. A bottoms fraction boiling above about 300° F. is withdrawn from separator 20 through line 23 and may be recycled to zone II through line 16, or removed as product from the system, in the desired proportion, through line 24, by suitable settings of the valves 25 and 26.

In the method of operation described in FIG. 1, both the reforming zone and the isomerization-cracking zone may be operated at substantially identical conditions, for example, at 800 to 900° F., 600 to 800 p.s.i.g. and at a space rate of from about 1 to 3 v./v./hr. Preferably, however, the isomerization-cracking zone is operated at somewhat lower temperatures (i.e., in the range 600 to 825° F.) than the reforming zone, and at somewhat higher pressures, preferably 1000 to 3000 p.s.i.g.

FIG. 2 illustrates a preferred modification of the invention wherein a naphtha feed is catalytically reformed, with the resulting reformate then being separated into normally gaseous and liquid components, and with only the heavier portion of the latter being sent to the isomerization-cracking zone II reactor for further conversion. More specifically, in the FIG. 2 system, the naphtha is introduced through line 30 to the reforming, zone I reactor 31, along with hydrogen as supplied from line 32, the hydrogen and naphtha being contacted in zone I with a reforming catalyst under appropriate reforming conditions. The effluent from zone I is then passed via line 33 into a high pressure, gas-liquid separator 34 from which a hydrogen-rich, gaseous stream is taken overhead through line 32 to be in part recycled to the zone I reactor, with the excess hydrogen being diverted through line 35 to be eventually fed to the zone II reactor 42. The bottoms from separator 34 are passed through line 37 into a separating unit 38 (which in practice would normally comprise a second, low pressure gas-liquid separator and one or more fractionating columns) from which the remaining normally gaseous components are indicated as being taken overhead through line 39 while a light gasoline product stream (as, for example, one boiling between about 100 and 325° F.) is shown as being recovered through line 40. The higher boiling portion of the feed to the unit 38 is taken as bottoms through line 41 and is passed to the isomerization-cracking zone II reactor 43, said hydrogen being made up of recycle from the zone II effluent (from line 46) as well as excess hydrogen from the reforming zone as supplied through line 35 and augmented, where required, by make-up hydrogen from line 36. The hydrocarbon feed to zone II reactor 42 may be augmented if desired by additional hydrocarbon passed through line 56 from other sources, so long as they boil below about 600° F. The effluent from the zone II reactor is passed through line 44 to a high pressure, gas-liquid separator 45 from which the aforementioned hydrogen-rich gaseous recycle stream is recovered through line 46, while the remainder of the zone II effluent is passed into a separator indicated at 48, which, as is the case with the unit 38, may also comprise a number of gas-liquid and/or distillation columns. For simplicity's sake, however, the remaining, normally gaseous portion of the zone II effluent is shown as being taken overhead from unit 48 through line 49, while a gasoline stream of desired end point is recovered through line 50. The heavier portion of the zone II effluent as, for example, that boiling above about 300 to 350° F., is taken as bottoms through line 51 and either recycled to the zone II reactor through 52 or withdrawn in whole or in part from the system through line 53, as determined by the setting of the valves 54 and 55.

The process of the invention is illustrated by the following examples:

*Example I*

A naphtha having the following inspections was subjected to catalytic reforming:

| | |
|---|---|
| A.P.I. gravity | 42.7 |
| Aniline point, ° F. | 112 |
| Volume percent aromatics | 25 |
| Volume percent paraffins plus naphthenes | 75 |
| F–1 clear octane number | 52.2 |
| ASTM D–86 distillation, ° F.: | |
|     Start | 310 |
|     10% point | 323 |
|     50% point | 350 |
|     90% point | 399 |

This naphtha was catalytically reformed by contacting it with a platinum catalyst consisting of 0.3% platinum disposed on an alumina support at 840 F., 500 p.s.i.g., and at a space velocity of 3.0 v./v./hr. 5000 cubic feet of hydrogen per barrel of naphtha were charged to contact with the catalyst. The volume of reformed naphtha produced containing 4 or more carbon atoms per molecule amounted to 95.4 volume percent of the naphtha charged. The reformed naphtha was fractionally distilled to remove lighter products boiling up to about 180° F. The heavier portion of the reformed naphtha had the following inspections:

| | |
|---|---|
| A.P.I. gravity | 39.8 |
| Aniline point, ° F. | 54 |
| Volume percent aromatics | 56 |
| Volume percent olefins | 1 |
| Volume percent paraffins plus naphthenes | 43 |
| F-1 clear octane number | 84.1 |
| ASTM D-86 distillation, ° F.: | |
| Start | 184 |
| 10% point | 303 |
| 50% point | 350 |
| 90% point | 413 |

This heavier (above 180° F.) fraction of the catalytically reformed naphtha was contacted in an isomerization-cracking zone with a synthetic silica-alumina cracking catalyst (TCC beads) containing 1.0% by weight of molybdenum oxide deposited thereon. 6000 cubic feet per barrel of hydrogen were charged to the catalyst with the naphtha. The naphtha and hydrogen were contacted with the catalyst at 700-800° F., 1200 p.s.i.g., and at a space velocity of 2 v./v./hr. During the reaction, 815 cubic feet of hydrogen were consumed per barrel of naphtha charged, the process being operated without recycle, and there being a per-pass conversion of approximately 50% in the isomerization-cracking zone. The debutanized reaction product had the following inspections:

| | |
|---|---|
| A.P.I. gravity | 50 |
| Aniline point, ° F. | 61 |
| Volume percent aromatics | 52 |
| Volume percent paraffins plus naphthenes | 48 |
| F-1 clear octane number | 86.1 |
| ASTM D-86 distillation, ° F.: | |
| Start | 118 |
| 10% point | 210 |
| 50% point | 298 |
| 90% point | 361 |

The aggregate volume of the latter reaction product and the light fraction of the catalytically reformed naphtha consisting of hydrocarbons containing 4 or more carbon atoms per molecule amounted to 96.8 volume percent of the original naphtha charged to the reforming step.

The results obtained by treating catalytically reformed naphtha, as shown above, are highly desirable. The gravity and octane number of the naphtha are both raised by the treatment, and the aromatic content is moderately lowered. Further, it will be observed that the following range of the above (converted) portion of the effluent from the isomerization-cracking zone has been shifted downwardly by approximately 50° at the 50% and 90% points, these being the points which are most critical from the standpoint of gasoline quality and blending characteristics.

*Example II*

In this operation there was employed as the feed to the reforming zone a naphtha blend two-thirds of which was a thermally cracked stock and one-sixth a straight run stock, both of California origin, together with one-sixth of straight run stock from an Arabian crude, the blend having the following characteristics:

| | |
|---|---|
| A.P.I. gravity | 51.7 |
| Aniline point, ° F. | 122 |
| Volume percent aromatics | 15 |
| F-1 clear octane number | 51.9 |
| ASTM D-86 distillation, ° F.: | |
| Start | 195 |
| 10% point | 231 |
| 50% point | 291 |
| 90% point | 368 |
| End point | 415-425 |

The above naphtha was catalytically reformed by contacting it with an alumina catalyst containing 0.3% by weight of platinum, at 870° F., 500 p.s.i.g., and a space velocity of 2 v./v./hr., 4000 s.c.f. $H_2$ being charged to the catalyst chamber per barrel of naphtha feed. The reformed naphtha so produced was freed of normally gaseous components and fractionally distilled so as to recover a $C_5$-300° F. fraction and a 300° F.+ fraction. Specifications on these latter fractions were as follows:

| | $C_5$-300° F. (65.7 Vol. Percent) | 300° F.+ (34.3 Vol. Percent) |
|---|---|---|
| A.P.I. gravity | 56.1 | 32.3 |
| Aniline point, ° F. | 93.9 | 81.0 (mixed) |
| Volume percent aromatics | 41 | 82 |
| Volume percent olefins | 0 | 1 |
| Volume percent paraffins plus naphthenes | 59 | 17 |
| F-1 clear octane number | 76 | 99 |
| ASTM D-86 Distillation: | | |
| 10% point ° F | | 330 |
| 50% point ° F | | 346 |
| 90% point ° F | | 377 |
| End point ° F | | 487 |

The above 300° F.+ fraction was then contacted in an isomerization-cracking zone with a catalyst comprising 1% by weight of molybdenum oxide deposited on a synthetic silica-alumina cracking catalyst (TCC beads), along with 6000 s.c.f. $H_2$ per barrel of feed, at 800° F., 1200 p.s.i.g. and a space velocity of 2 v./v./hr. The effluent from the isomerization-cracking zone was freed of normally gaseous components and distilled into a gasoline fraction having a 90% point well below 300° F., and an end point of approximately 340-350° F., and a bottoms fraction. It was found that (excluding the bottoms) the $C_4$+ yield was 32 volume percent, whereas the $C_5$+ yield was 28 volume percent. The bottoms were then subjected to a substantially identical processing step as described above in connection with the 300° F.+ fraction from the reforming zone. In this case the conversion to $C_4$+ product (less bottoms) was 43% and to the $C_5$+ product 39%. Substantially these same yields were obtained when the bottoms from this second processing step were subjected to a third processing, under the same conditions, in the isomerization-cracking zone, thus indicating that all portions of the 300° F.+ fraction from the reforming zone could be converted to product boiling essentially below 300° F. Assuming an ultimate conversion of 100%, as obtained either by staged or recycle operation, this represents a $C_4$+ gasoline yield of 100.5 volume percent and a $C_5$+ gasoline yield of 91.3 volume percent. The hydrogen consumption taking place in the isomerization-cracking zone during each of the three processing steps was 650 s.c.f., 550 s.c.f. and 535 s.c.f., respectively, for each barrel of feed supplied to the zone during the particular step involved. This represents an average of about 1760 s.c.f. $H_2$ for each barrel of $C_5$+ gasoline produced and blended, as indicated above.

The $C_5$+ gasoline fractions (not including the bottoms fractions boiling above 340-350° F.), as obtained from staged processing through the isomerization-cracking zone, were blended and found to have the following characteristics:

| | |
|---|---|
| A.P.I. gravity | 43 |
| Aniline point, ° F. (mixed) | 85 |
| Volume percent aromatics | 69 |
| F-1 clear octane number | 100.6 |
| ASTM D-86 distillation, ° F.: | |
| Start | 90 |
| 10% point | 196 |
| 50% point | 264 |
| 90% point | 284 |
| End point | 343 |

It is evident that operation in the manner described above (wherein the heavier portion of the effluent from the reforming zone is passed through an isomerization-cracking zone) results in the production, in excellent yield, of a premium gasoline blending stock which not only has even better octane characteristics than the feed as obtained from the reforming zone, but also a much lower over-all boiling point range. This permits the stock to be blended with higher boiling components and still meet premium gasoline volatility requirements.

While the invention has been described above in connection with methods of fixed catalyst bed operation wherein the catalyst (particularly that in the isomerization-cracking zone) is periodically regenerated in situ, the process is also well adapted to be carried out using moving catalyst beds or fluidized catalyst systems. In the latter methods of operation, wherein the general procedures to be employed are now well established in the art, separate vessels are employed for the respective reaction and regeneration units. However, since in carrying out the process of this invention the catalyst in both zones maintains good activity over relatively long periods of time, it is preferred from an economic standpoint to employ the fixed catalyst bed method of operation or some modification thereof.

I claim:

In a process for producing gasoline employing in combination a conventional reforming zone and an isomerization-cracking zone containing a catalyst comprising a hydrogenating-dehydrogenating component disposed on an active cracking support, said isomerization-cracking zone being operated during at least a portion of the on-stream period at a temperature between 700° and 900° F., a pressure above 600 p.s.i.g., a space velocity from about 0.2 to 15 v./v./hr. and a per-pass conversion of 25–75%, the improvement which comprises first reforming in said reforming zone a naphtha boiling from 180° to 550° F. and obtained from a source other than said isomerization-cracking zone, separating from the catalytic reformate all materials boiling below about 250° F. and above about 600° F., passing as a hydrocarbon feed to said isomerization-cracking zone only the remaining hydrocarbons boiling between about 250° and 600° F., comprising a major portion of the aromatics in the effluent from said reforming zone, converting a substantial portion of said feed in said isomerization-cracking zone at a temperature between about 500° and 900° F., a pressure of at least 600 p.s.i.g., and a space velocity between about 0.2 and 15, in the presence of a catalyst comprising nickel sulfide on an active cracking support and in the presence of at least 1500 s.c.f. of $H_2$ per barrel of feed to a normally liquid gasoline having an appreciably lower aromatics content than said feed, and recovering from said isomerization-cracking zone as a product at least substantially all of said gasoline boiling up to 300° F.

References Cited in the file of this patent

UNITED STATES PATENTS

| | | |
|---|---|---|
| 2,380,279 | Welty | July 10, 1945 |
| 2,383,072 | Oblad | Aug. 21, 1945 |
| 2,573,149 | Kassel | Oct. 20, 1951 |
| 2,596,145 | Grote | May 13, 1952 |
| 2,799,626 | Johnson et al. | July 16, 1957 |
| 2,908,629 | Thomas | Oct. 13, 1959 |